United States Patent
Hammond et al.

(10) Patent No.: US 12,287,677 B2
(45) Date of Patent: Apr. 29, 2025

(54) SYSTEM AND METHOD FOR SUPPORTING HARDWARE COMPONENTS

(71) Applicant: Dell Products L.P., Round Rock, TX (US)

(72) Inventors: Mark Hammond, Round Rock, TX (US); James Frederic Mckinney, Leander, TX (US); Scott Elvin Johnson, Round Rock, TX (US); Karl Isaac Hamand, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 413 days.

(21) Appl. No.: 17/933,594

(22) Filed: Sep. 20, 2022

(65) Prior Publication Data
US 2024/0094776 A1    Mar. 21, 2024

(51) Int. Cl.
*G06F 1/16* (2006.01)
(52) U.S. Cl.
CPC .................................. *G06F 1/1656* (2013.01)
(58) Field of Classification Search
CPC .................................................... G06F 1/1656
See application file for complete search history.

(56) References Cited

U.S. PATENT DOCUMENTS

| 2008/0298010 A1* | 12/2008 | Chou ...................... G06F 1/186 |
| | | 361/679.41 |
| 2015/0155900 A1* | 6/2015 | Myers ................ G06K 13/0831 |
| | | 206/722 |

OTHER PUBLICATIONS

"PCI Express Card Electromechanical Specification Revision 2.0", PCI-SIG, Apr. 11, 2007, 106 pages.

* cited by examiner

Primary Examiner — Hung S. Bui
Assistant Examiner — Elisa Sasserath
(74) Attorney, Agent, or Firm — WOMBLE BOND DICKINSON (US) LLP

(57) ABSTRACT

Methods, systems, and devices for providing computer implemented services are disclosed. To provide the computer implemented services, the quantity of hardware resources available for providing the computer implemented services may be modified. The quantity of hardware resources may be modified by adding removable cards to a host system. When the removable card is added, a removable attachment element may be used to secure the removable card in place and maintain operable connection between the host system and the removable card.

20 Claims, 13 Drawing Sheets

SYSTEM AND METHOD FOR SUPPORTING HARDWARE COMPONENTS

FIELD DISCLOSED HEREIN

Embodiments disclosed herein relate generally to device management. More particularly, embodiments disclosed herein relate to systems and methods to secure devices in data processing systems.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
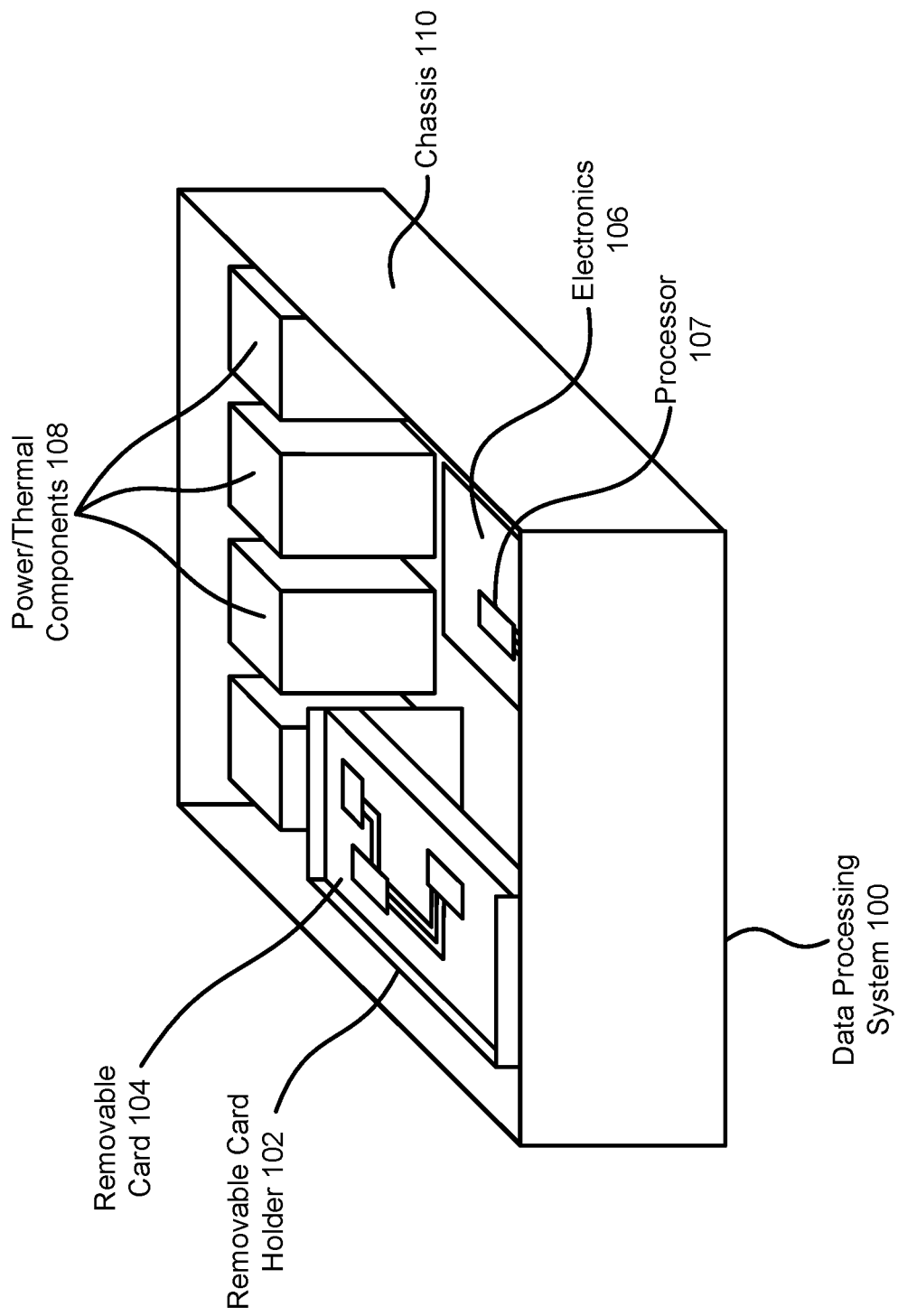
FIG. 1A shows a diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services. The computer implemented services may include any quantity and type of such services.

To provide the computer implemented services, one or more of the data processing systems may be utilized. The type and quantity of service provided by the data processing systems may be limited based on the hardware resources available to the data processing systems.

To provide flexibility with respect to the available hardware resources, the data processing systems may include removable card holders usable to add hardware resources to the data processing systems. To do so, removable cards may be inserted into the removable card holders which may operably connect the hardware resources of the removable cards to other hardware resources of the data processing system, thereby allowing for increase hardware resource availability.

To improve the likelihood of the hardware resources of the removable cards being available, the removable card holders may include a removable attachment element. The removable attachment element may maintain alignment of the removable card while positioned in the removable card holder. By doing so, operably connections between the removable cards and a host data processing system may be more likely to be made and maintained.

To provide for compatibility with a broad array of different types of removable cards, the removable attachment element may be adaptable and/or interchangeable with other removable attachment elements. Different removable attachment elements may include mechanical features for securing different types of removable cards having varying geometries.

Thus, embodiments disclosed herein may provide an improved data processing system that is capable of receiving and securing a range of removable cards having various geometries. Consequently, the likelihood of forming operable connections necessary for use and operation of the removable cards may be improved when compared to systems that do not include adjustable features for handling varying removable card geometries.

In an embodiment, a data processing system in accordance with an embodiment is provided. The data processing system may include a processor; and a removable card holder. The removable card holder may include: complementary electrical contacts operably connected to the processor, the complementary electrical contacts being adapted to contact electrical contacts of a removable card while the removable card is positioned in the removable card holder to form an operable connection between the processor and the removable card; an extension adapted to: translate between two positions, in a first position of the two positions the extension is a first distance away from the complementary electrical contacts and in the second position of the two positions the extension is a second distance away from the complementary electrical contacts; and a removable attachment element adapted to: reversibly attach to the extension, and while attached to the extension and the extension is in the first position and the removable card is positioned in the removable card holder, maintain alignment of the removable card between the complementary electrical contacts and the extension.

The removable attachment element may include a receiver having a complementary shape to an edge of the removable card, the complementary shape being sized to allow the edge of the removable card to be partially positioned inside and interior region of the receiver.

The removable attachment element may include: a first face adapted for the reversible attachment to the extension; and a second face adapted to receive the removable card. The first face and the second face are on opposite sides of the removable attachment element.

The first face may include: an alignment element for insertion into a complementary alignment feature of the extension. The alignment element may be adapted to, while inserted in the complementary alignment feature, position a fixation element of the removable attachment element with respect to a complementary fixation element of the extension. The fixation element fixedly secures the removable attachment element to the extension, and fixedly securing the removable attachment element to the extension including a temporary deformation of the fixation element as the fixation element moves toward the complementary fixation element.

The removable attachment element may include a second receiver to receive a second removable card.

The removable attachment element may include a receiver having a shelf shape adapted to receive an edgeless removable card, the shelf shape preventing: first movement of the removable card away from the complementary contacts; and second movement of the removable card in a first rotation about the complementary contacts.

The shelf shape enables third movement of the removable card in a second rotation about the complementary contacts, the second movement and the third movement being in opposite directions.

The shelf shape is adjustable to facilitate engagement with removable cards of varying thicknesses.

The removable card holder may include an enclosure and an attachment feature through which the extension is attached to a device cage.

The attachment feature may be adapted to allow the extension to translate with respect to the complementary electrical contacts.

In an embodiment, a method for adding a removable card to a data processing system is provided.

In an embodiment, a removable card, as discussed above, is provided.

Turning to FIG. 1A, a diagram illustrating a system in accordance with an embodiment is shown. The system may provide computer implemented services. To provide the computer implemented services, the system may include data processing system 100.

Data processing system 100 may include functionality to provide various types of computer implemented services. The computer implemented services may include any number and type of computer implemented services. The computer implemented services may include, for example, database services, data processing services, electronic communication services, and/or any other services that may be provided using one or more computing devices. Other types of computer implemented services may be provided by data processing system 100 without departing from embodiments disclosed herein.

To provide the computer implemented services, data processing system 100 may include various components such as electronics 106 and power/thermal components 108. Electronics 106 may include various types of hardware components such as processors (e.g., 107), memory modules, storage devices, communications devices, and/or other types of devices. Any of these hardware components may be operably connected to one another using circuit card traces, cabling, connectors, etc.

Power/thermal components 108 may power to any of the components of data processing systems 100 and/or thermally mange any of the components of data processing systems 100. For example, power/thermal components 108 may include power supplies, fans, and/or other types of devices usable to power and/or thermally manage the components.

To provide different types of computer implemented services, various types of computing resources (e.g., provided by hardware devices) may be utilized. Consequently, the computing resources of a data processing system may vary depending on how the system is used. For example, to provide database services, data processing system 100 may utilize large amounts of storage resources (which may be provided by storage devices such as solid state drives or other types of storage devices). In contrast, to provide instant messaging services, data processing system 100 may utilize large amounts of communication resources (which may be provided by communications devices such as network interface cards).

To facilitate flexibility in the available computing resources, data processing system 100 may include removable card holder 102. Removable card holder 102 may facilitate interconnection of various removable cards (e.g., 104) to electronics 106. While interconnected via removable card holder 102, a removable card (e.g., 104) may contribute its computing resources for the performance of various tasks managed by electronics 106. Consequently, the computing resources of a data processing system may be modified be adding and/or removing removable cards to or from removable card holder 102.

For example, removable card 104 may be operably connected to processor 107 via removable card holder 102. Processor 107 may task removable card 104 with performing various functions that may be used by processor 107 in providing various computer implemented services. However, at other points in time processor 107 may be tasked with providing other services that do not need the resources provided by removable card 104. In such a scenario, removable card 104 may be removed and other removable cards may be inserted into removable card holder 102 thereby providing processor 107 with access to other types of computing resources.

In an embodiment, removable card holder 102 is implemented as a peripheral component interconnect express (PCIe) device cage or other type of structure for holding various devices that host various hardware components that may contribute computing resources to a data processing system. A device cage may be physical structure that bounds a volume in which removable cards may be positioned. In FIG. 1, removable card holder 102 is illustrated with an open top side (e.g., to facilitate visibility of removable card 104. However, a removable card holder may include any number of walls that bound a space in which any number of removable cards may be positioned. When so positioned, removable card holder 102 may operably connect the removable cards to electronics 106 and/or other components.

For example, removable card holder 102 may include one or more electrical connectors (which may include any number of electrical contacts such as circuit card pads) which may provide electrical connections to removable cards (e.g., using complementary electrical connectors on the removable cards) positioned in removable card holder 102. The electrical connectors of removable card holder 102 may be operably connected to electronics 106 (e.g., via traces, cabling, etc.) thereby facilitating operable connection between removable cards positioned in removable card holder 102 and various other components of data processing system 100.

Removable cards may be implemented with physical devices that include any number of hardware components. When positioned in removable card holder 102, one or more of the hardware components of the removable card may be operably connected to electronics 106 (or a portion thereof) and/or other devices. The removable cards may include complementary electrical connectors (e.g., circuit card pads if an edge connector is implemented) that allow for formation of operable connections between the removable cards and the removable card holder.

However, misalignment of the complementary connectors of the removable cards with the electrical connectors of removable card holder 102 may, for example, prevent the formation of desired operable connections, result in the generation of undesired operable connections, may place undesired levels of physical stress on the electrical contacts, and/or may result in other undesirable impacts.

In general, embodiments disclosed herein relate to systems, methods, and devices for improving the likelihood of forming and/or maintaining desired operable connections between removable cards and removable card holders. To do so, embodiments disclosed herein may facilitate alignment of removable cards (or more specifically, complementary electrical contacts) with removable card holders (or more specifically, electrical contacts). By facilitating alignment of removable cards with removable card holders, desired operable connections may be more likely to be formed and/or maintained even while various forces (e.g., gravity) are applied to removable cards in a manner that may result in misalignment.

Figure 1B:
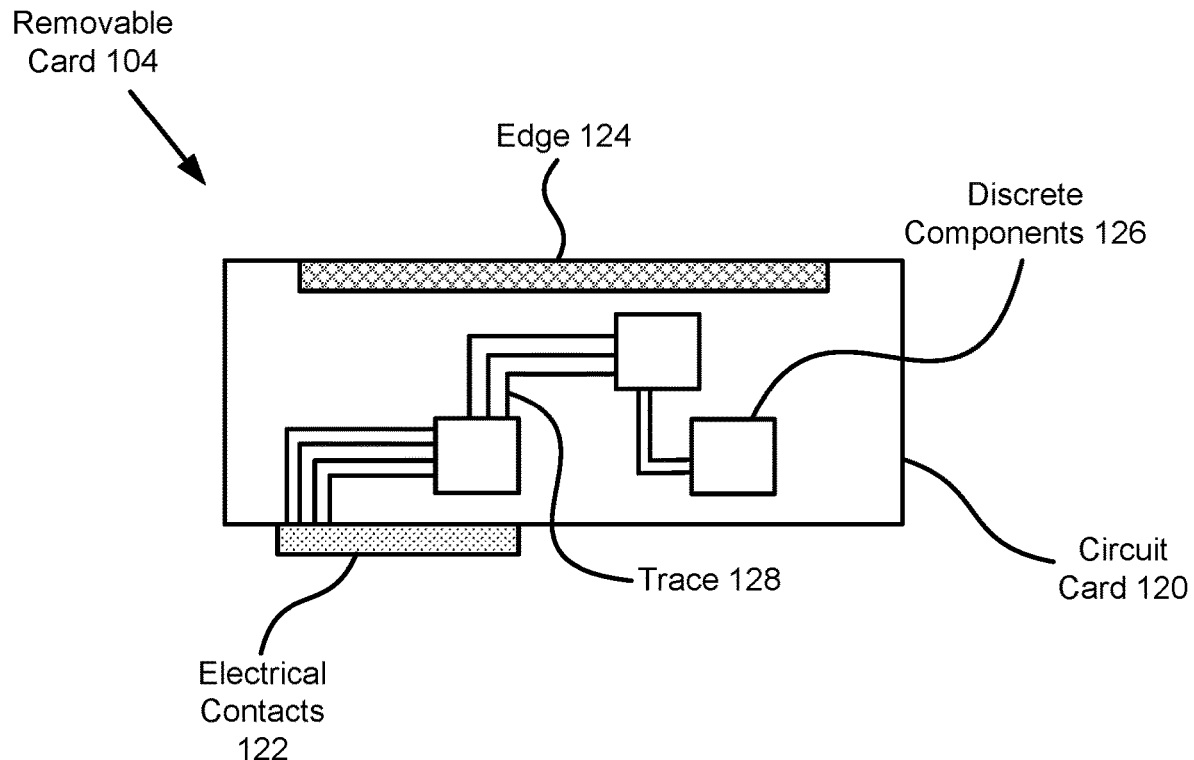
FIG. 1B shows a top view diagram illustrating a removable card in accordance with an embodiment.
Figure 1C:
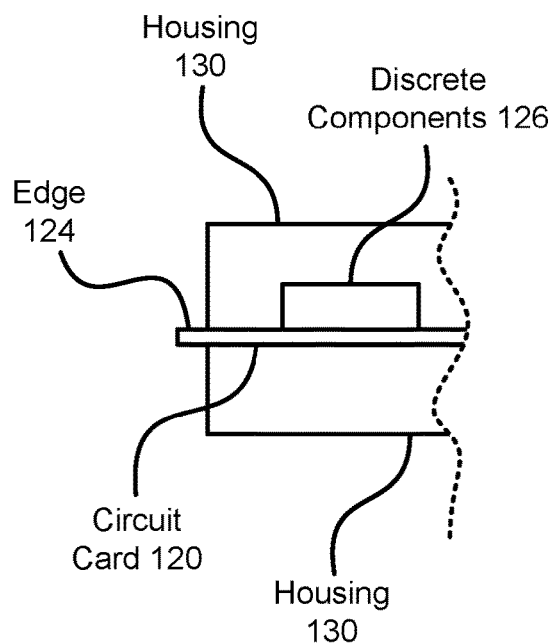
FIG. 1C shows a side view diagram illustrating a removable card in accordance with an embodiment.
Figure 1D:
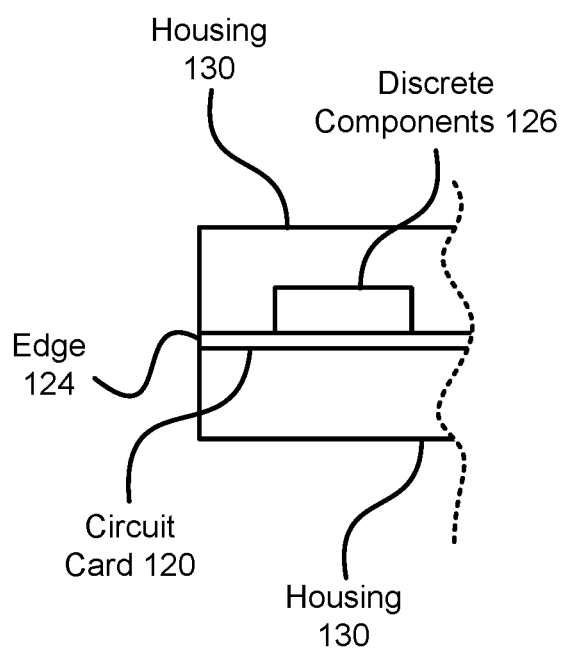
FIG. 1D shows a side view diagram illustrating a removable card in accordance with an embodiment.

To improve the likelihood of forming and/or maintaining desired operable connections, a system in accordance with embodiments disclosed herein may include removable card holders that include one or more adaptable features for securing removable cards and/or removable card holders. The one more adaptable features may facilitate alignment of removable cards that may have varying physical geometries. The adaptable features may allow removable card holder 102 to position different removable cards having different geometries. Consequently, a data processing system in accordance with embodiments disclosed herein may have improved flexibility with respect to the types of removable cards that may be utilized with it as well as improving the likelihood of forming and/or maintaining desired operable connections. Refer to FIGS. 1B-1D for additional details regarding removable cards, and FIGS. 1E-1J for additional details regarding removable card holders in accordance with embodiments disclosed herein.

While illustrated in FIG. 1A with a limited number of specific components, a system may include additional, fewer, and/or different components without departing from embodiments disclosed herein.

Turning to FIG. 1B, a diagram illustrating removable card 104 in accordance with an embodiment is shown. As discussed above, removable card 104 may contribute computing resources (e.g., by performing operations) to a data processing system when positioned in a removable card holder.

To provide computing resources, removable card 104 may include circuit card 120 and any number of discrete components 126. Discrete components 126 may include, for example, packaged integrated circuits (e.g., "computer chips"), individual components such as resistor or capacitors, and/or other types of hardware components. Circuit card 120 may include traces 128 that interconnect (e.g., electrically) any of discrete components 126 and electrical contacts 122. While illustrated in FIG. 1B with an example topology, a removable card may include different types and/or arrangements of discrete components and electrical contacts 122, and/or different interconnection topologies facilitated by traces.

In an embodiment, removable card 104 is implemented as a PCIe card. The PCIe standard may define various standards that removable card 104 meet including, for example, the structure and positioning of electrical contacts 122 and dimensional limitations on removable cards 104. The PCIe standard may also specify, for example, a geometry of edge 124 (e.g., a "north edge"). Edge 124 may be on a side of removable card holder 102 opposite of electrical contacts 122.

To position removable card 104 in a removable card holder, edge 124 may be utilized. For example, edge 124 may be positioned in a plane in which the complementary electrical contacts of a removable card holder are positioned. Edge 124 may be positioned in this plane to improve the likelihood of alignment between electrical contacts 122 and complementary contacts of a removable card holder.

To position edge 124, a removable card holder may be adaptable so that it may mechanically interface with various geometries that edge 124 may have depending on the implementation of removable card 104. For example, depending on implementation, edge 124 may include different mechanical features. Refer to FIGS. 1C-1D for additional details regarding edge 124.

Positioning edge 124 may also, for example, prevent or reduce the likelihood of electrical contacts 122 from moving with respect to complementary contacts of a removable card holder in response to mechanical force (e.g., gravity). For example, if a data processing system that includes removable card 104 positioned in a removable card holder is dropped, the resulting mechanical forces applied upon impact with the ground may tend to dislodge removable card 104 from the removable card holder. The removable card holder may include one or more mechanical features that retain the position of edge 124 in response to mechanical forces thereby reducing the likelihood of dislodgement (partial or total) of removable card 104.

While illustrated in FIG. 1B with a limited number of specific components, a removable card may include additional, fewer, and/or different components without departing from embodiments disclosed herein.

As discussed above, removable card 104 may include an edge having different geometries. FIGS. 1C-1D illustrate example of various geometries of edge 124.

Turning to FIG. 1C, a first diagram of a portion of removable card 104 in accordance is shown. In FIG. 1C, the viewpoint may be from the left hand side of FIG. 1B, looking towards removable card 104.

As seen in FIG. 1C, edge 124 may include a portion of circuit card 120 (or another structures) that extends outward (e.g., to the left in FIG. 1C), away from housing 130 (not shown in FIG. 1B). Consequently, edge 124 may have a profile that includes a raised portion (e.g., the portion of circuit card 120 extending past housing 130).

While not illustrated in FIG. 1B to facilitate a view of various portions of removable card 104, removable card 104 may include housing 130. Housing 130 may be implemented with a shell, walls, and/or other structures that partially or totally surround discrete components 126 and/or circuit card 120. Housing 130 may provide a degree of physical protection to these components, may guide airflow proximate to these components, and/or may perform other functions.

Turning to FIG. 1D, a second diagram of a portion of removable card 104 in accordance is shown. In FIG. 1D, the viewpoint may be from the left hand side of FIG. 1B, looking towards removable card 104 (e.g., similar to that in FIG. 1C.

As seen in FIG. 1D, edge 124 may include a portion of circuit card 120 (or another structures) that aligns with housing 130 (not shown in FIG. 1B). Consequently, edge 124 may have a profile that does not include a raised portion as discussed with respect to FIG. 1C. In contrast, the profile of edge 124 may be flat.

Likewise, while not illustrated in FIG. 1B, removable card 104 may include housing 130. Housing 130 may be implemented with a shell, walls, and/or other structures that partially or totally surround discrete components 126 and/or circuit card 120. Housing 130 may provide a degree of physical protection to these components, may guide airflow proximate to these components, and/or may perform other functions.

As seen in FIG. 1D, housing 130 and circuit card 120 may align (e.g., along the left hand side of the figure) thereby presenting a substantially flat face as edge 124 (or at least may not include a raised portion). In contrast, edge 124 as illustrated in FIG. 1C may present a non-uniform face with a raised portion.

These differences in profiles may present challenges in positioning various removable cards in removable card holders. For example, if it is presumed that all removable cards may have a profile as illustrated in FIG. 1C, a removable attachment element designed to secure only that type of profile may not be able to retain an edge having a profile as illustrated in FIG. 1D. To address these challenges, a removable card holder in accordance with embodiments disclosed herein may include functionality to adapt its shape to complement a profile of an edge of a removable card. By doing so, the removable card holder may be capable of securing the edges of removable cards regardless of the geometry of an edge of the removable card.

To manage removable cards having various profiles, a removable card holder may be utilized. FIGS. 1E-1J illustrate diagrams in accordance with embodiments that show features of removable card holders that may provide for compatibility with removable cards of varying geometry.

Figure 1E:
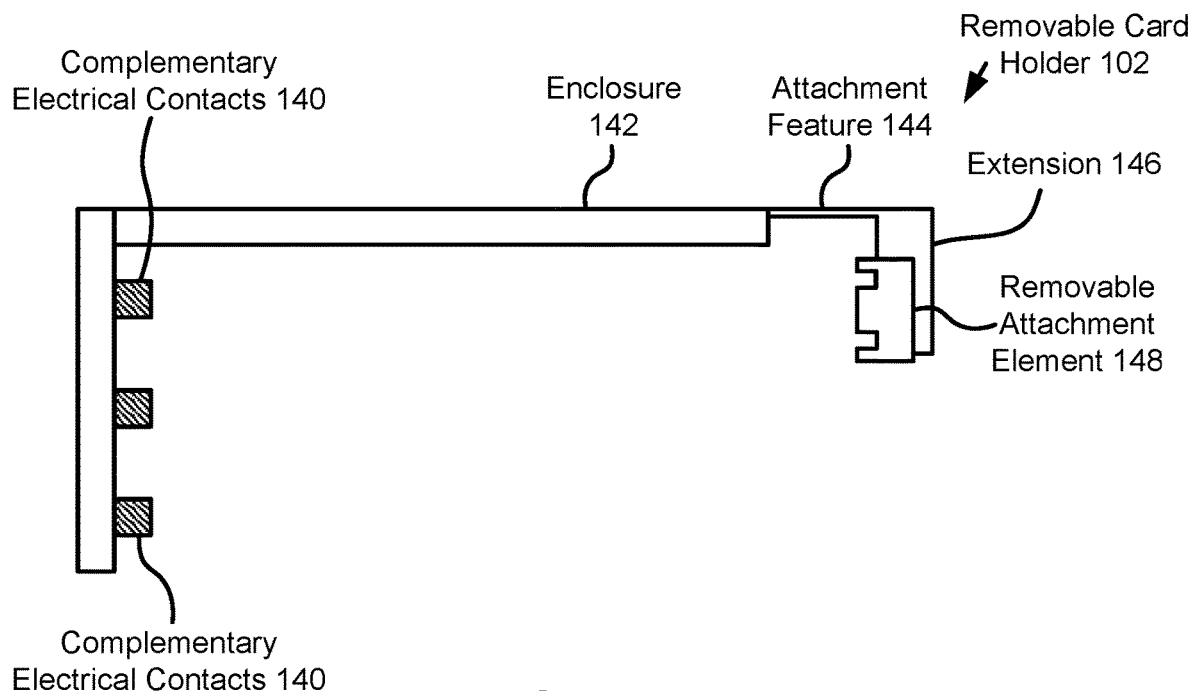
FIG. 1E shows a side view diagram illustrating a removable card holder in accordance with an embodiment.

Turning to FIG. 1E, a diagram of removable card holder 102 in accordance with an embodiment is shown. In FIG. 1E, an end view of removable card holder 102 is illustrated where the lengths of removable cards (not shown) positioned in removable card holder 102 may be aligned into and out of the page. When so positioned, the electrical contacts of the removable cards may be positioned on the left side of the page and the edges may be positioned on the right side of the page, as will be discussed in more detail below.

Removable card holder 102 may secure the edges of removable cards having a variety of different geometries. To do so, removable card holder 102 may include complementary electrical contacts 140, enclosure 142, extension 146, and removable attachment element 148. Each of these components is discussed below.

Complementary electrical contacts 140, as discussed above, may be operably connected to the processor (e.g., 107). The complementary electrical contacts 140 may be adapted to contact electrical contacts of a removable card (e.g., 104) while the removable card is positioned in the removable card holder 102 to form an operable connection between the processor and the removable card.

Complementary electrical contacts 140, may facilitate the formation of operable connections between removable cards and other components while the removable cards are positioned in removable card holder 102. Complementary electrical contacts 140 may be capable of forming an electrical connection with electrical contacts of a removable card positioned in removable card holder 102. While illustrated in FIG. 1E as including three complementary electrical contacts 140, removable card holders may include different numbers of complementary contacts without departing from embodiments disclosed herein.

Complementary electric contacts 140 may conform to a standard such as the PCIe standard (or other type of standard). Likewise, the electrical contacts of removable cards may also conform to a similar standard. The standard may presume a certain degree of alignment between the electrical contacts and the complementary electrical contacts. If the degree of alignment is not met, undesired electrical connections may be formed (and/or desired electrical connections may not form).

The removable card holder 102 may include an enclosure 142 and an attachment feature 144 through which the extension 146 is attached to enclosure 142. The attachment feature 144 may be adapted to allow the extension 146 to translate with respect to the complementary electrical contacts 140 thereby allowing for extension 146 to move towards and/or away from complementary electrical contacts 140. For example, extension 146 may move between a first position and a second position. The first position may be closer to the complementary electrical contacts 140 and the second position may be away from the complementary electrical contacts 140. A removable card 104 may be inserted into the removable card holder 102 while extension 146 is in the second position. Once inside, extension 146 may be moved to the first position to secure the removable card in removable card holder 102.

The enclosure 142 may be a physical structure that bounds a volume in which removable cards may be positioned in removable card holder 102. Enclosure 142 may include walls and/or other types of structural members. The other components of removable card holder 102 may be attached to enclosure 142 and thereby allow for positioning of the other components with respect to one another. The structural members of enclosure 142 may also provide a degree of physical protection to removable cards positioned in the volume. The structural members may cover all, or a portion, of the surface of the volume.

Extension 146 may be a physical structure that allows removable attachment element 148 to be positioned with respect to removable cards (as well as complementary electrical contacts 140) positioned in removable card holder 102. For example, extension 146 may be implemented with a structural member that extends from a top side of enclosure 142. In an embodiment, extension 146 is movable with respect to enclosure 142 (e.g., via attachment feature 144) so that the distances between complementary electrical contacts 140 and corresponding removable attachment element (e.g., 148) may be adjusted. For example, the distances may be increased while removable cards are being inserted into removable card holder 102 and the distances may be decreased once the removable cards are inserted (e.g., thereby causing the removable attachment element to come into contact with edges of removable cards).

Removable attachment element 148 may be adapted to reversibly attach to extension 146, and while attached to the extension 146 and the extension 146 is in the first position and the removable card 104 is positioned in the removable card holder 102, maintain alignment of the removable card 104 between the complementary electrical contacts 140 and the extension 146. Removable attachment element 148 may be attached to the extension 146 to provide support for the removable card 104 when the removable card 104 is inserted in the removable card holder 102 and the extension 146 is in the first position. Removable attachment element 148 may be removed from the extension 146 when the removable card 104 is not inserted in the removable card holder 102.

As shown in FIG. 1E, removable attachment element 148 may be implemented with a physical structure for maintaining alignment of a removable card 104 positioned in removable card holder 102. Removable attachment element 148 may do so by maintaining positioning of an edge of a removable card. Removable attachment element 148 may be adaptable to interface with a variety of profiles of edges of removable cards, discussed with respect to FIGS. 1E-1I. By doing so, different cards having different edge profiles may be positioned in removable card holder 102, thereby improving the likelihood of desirable electrical connections to be formed between the contacts of removable cards and complementary electrical contacts 140.

While illustrated in FIG. 1E with a limited number of specific components, a removable card holder may include additional, fewer, and/or different components without departing from embodiments disclosed herein.

Figure 1F:
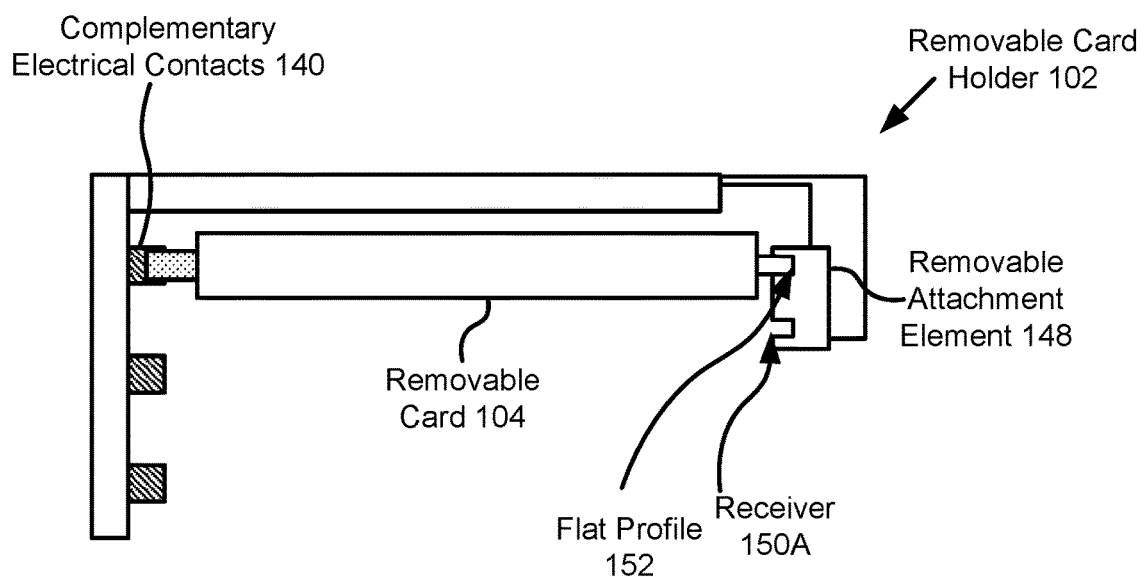
FIG. 1F shows a side view diagram illustrating a removable card holder and a removable card in accordance with an embodiment.

Turning to FIG. 1F, a diagram of removable card holder 102 with removable attachment element 148, and removable card 104 positioned therein in accordance with an embodiment is shown. Removable attachment element 148 may include a receiver 150A having a complementary shape to an edge of removable card 104. The complementary shape may be sized to allow the edge of the removable card to be partially positioned inside an interior region of receiver 150A (e.g., a slot, recess, and/or other physical feature). The edge of removable card 104 shown in FIG. 1F may have a flat profile 152 in this example figure. To secure the edge of removable card 104, receiver 150A of removable attachment element 148 may be implemented with a slot, recess, and/or other shape that is complementary to flat profile 152 of removable card 104. Consequently, receiver 150A of removable attachment element 148 may reduce the likelihood that the edge of the removable card 104 moves towards or away from complementary electrical contacts 140 and/or upward or downward on the page of FIG. 1F (which may cause electrical contacts of removable card 104 to become misaligned with complementary electrical contacts 140). For additional details regarding removable attachment element 148, refer to FIGS. 1G-1J.

Figure 1G:
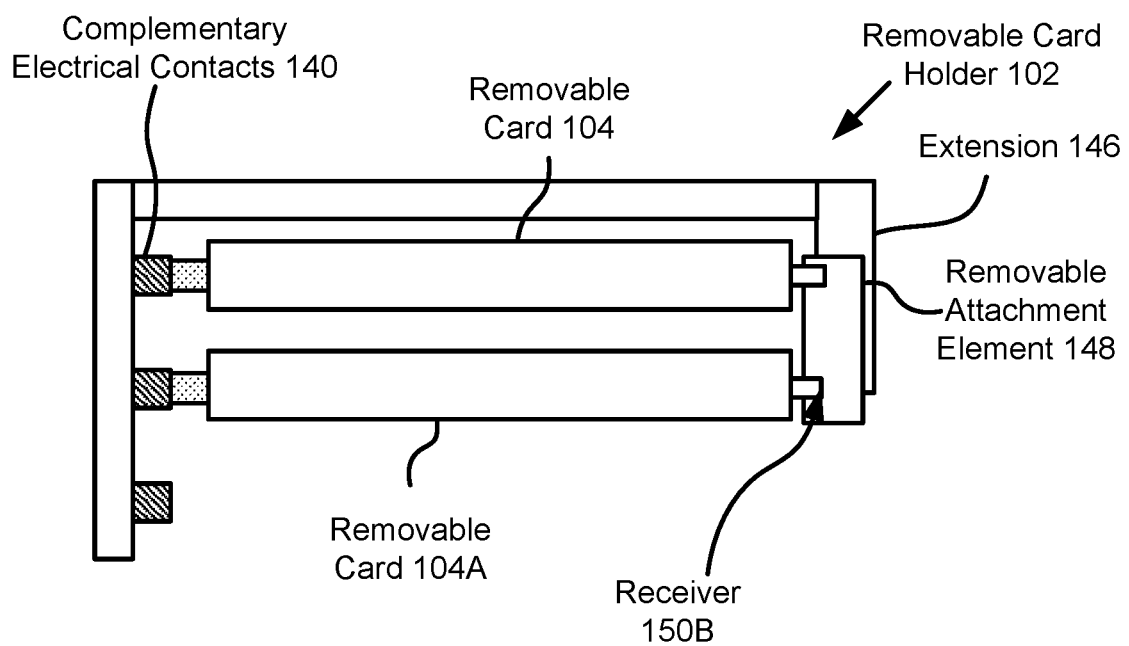
FIG. 1G shows a side view diagram illustrating a removable card holder and removable cards in accordance with an embodiment.

Turning to FIG. 1G, a second diagram of removable card holder 102 and removable attachment element 148 with removable cards (e.g., 104 and 104A) positioned therein in accordance with an embodiment is shown. As seen in FIG. 1G, removable card holder 102 may be populated with two removable cards (e.g., 104 and 104A). Removable attachment element 148 may include multiple receivers (e.g., 150A, 150B) for securing the edges of the removable cards (e.g., 104, 104A). The receivers in this example may be of similar geometry, but it will be understood that the receivers may have different geometries to accommodate removable cards with different edge profiles.

While illustrated in FIG. 1G with two receivers, a removable attachment element may include additional, and/or fewer receivers without departing from embodiments disclosed herein.

Figure 1H:
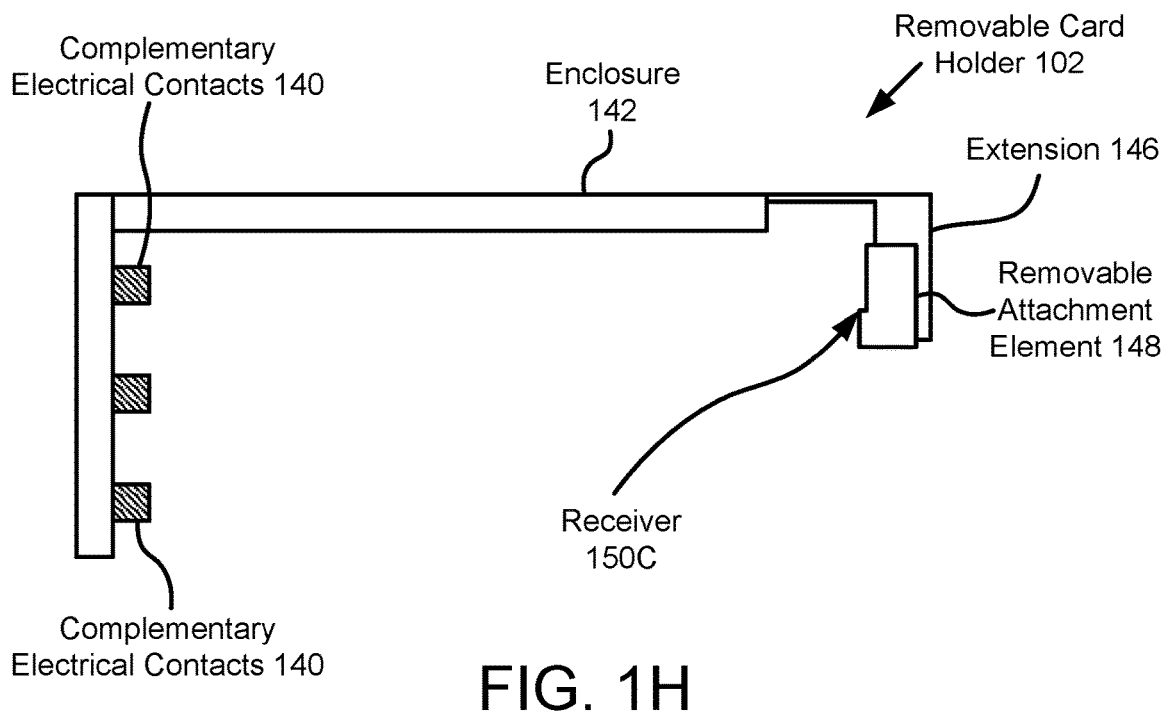
FIG. 1H shows a side view diagram illustrating a removable card holder in accordance with an embodiment.
Figure 1I:
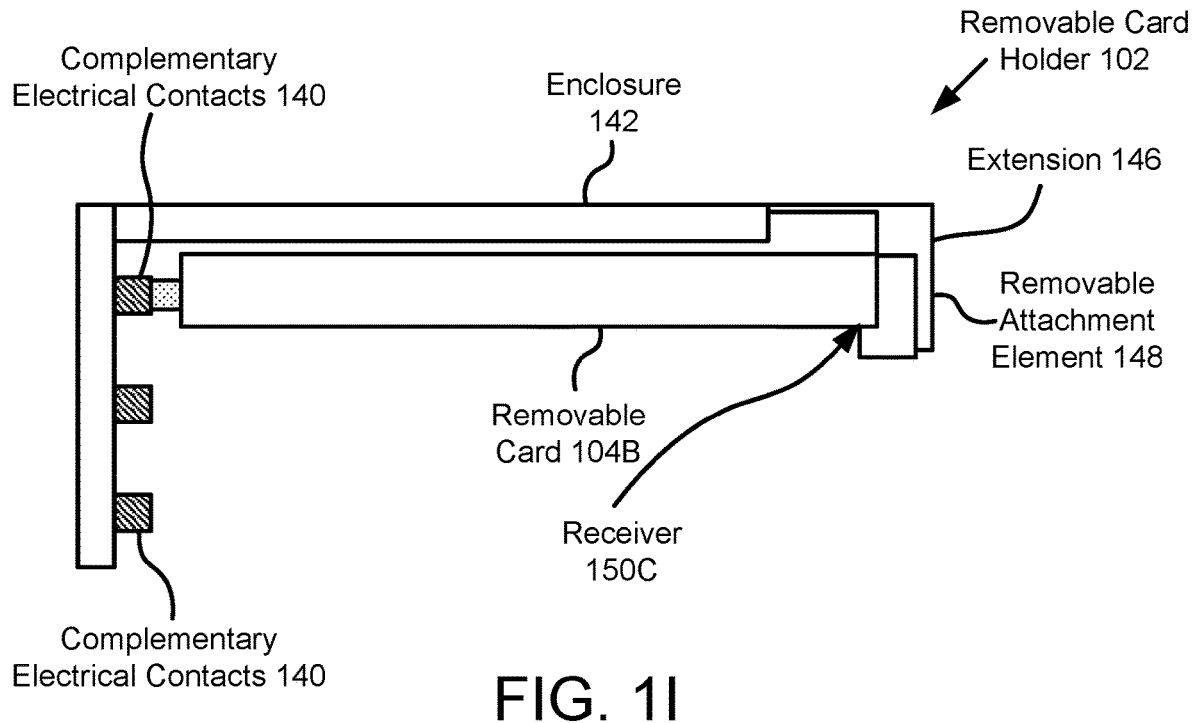
FIG. 1I shows a side view diagram illustrating a removable card holder and a removable card in accordance with an embodiment.

Turning to FIG. 1H, a diagram of removable card holder 102 in accordance with an embodiment is shown. In FIG. 1H, removable attachment element 148 may include a receiver 150C having a shelf shape. The shelf shape 154 may allow for removable cards that do not have protruding edges to be secured in place. In contrast to the other receivers (e.g., 150A, 150B) that enclose multiple sides of an edge of a removable card, the shelf shape may allow for removable cards of varying thicknesses to be supported. Refer to FIG. 1I for an example of a removable card that does not include a protruding edge. For additional details regarding receiver 150C having a shelf shape, refer to FIG. 2.

Turning to FIG. 1I, a diagram of removable card holder 102 with removable card 104 inserted therein in accordance with an embodiment is shown. Similar to FIG. 1F, removable attachment element 148 may include receiver 150C having a complementary shape to an edge of removable card 104. In contrast to FIG. 1F, removable attachment element 148 shown in FIG. 1I may include receiver 150C having an adjustable shelf shape adapted to receive an edgeless removable card 104B. The shelf shape may restrict movement of removable card 104B away from complementary electrical contacts 140 and movement of removable card 104B about complementary electrical contacts 140 in a first direction (e.g., clockwise in FIG. 1I). However, the shelf shape may not restrict movement of removable card 104B about complementary electrical contacts 140 in a second direction (e.g., counterclockwise in FIG. 1I).

Figure 1J:
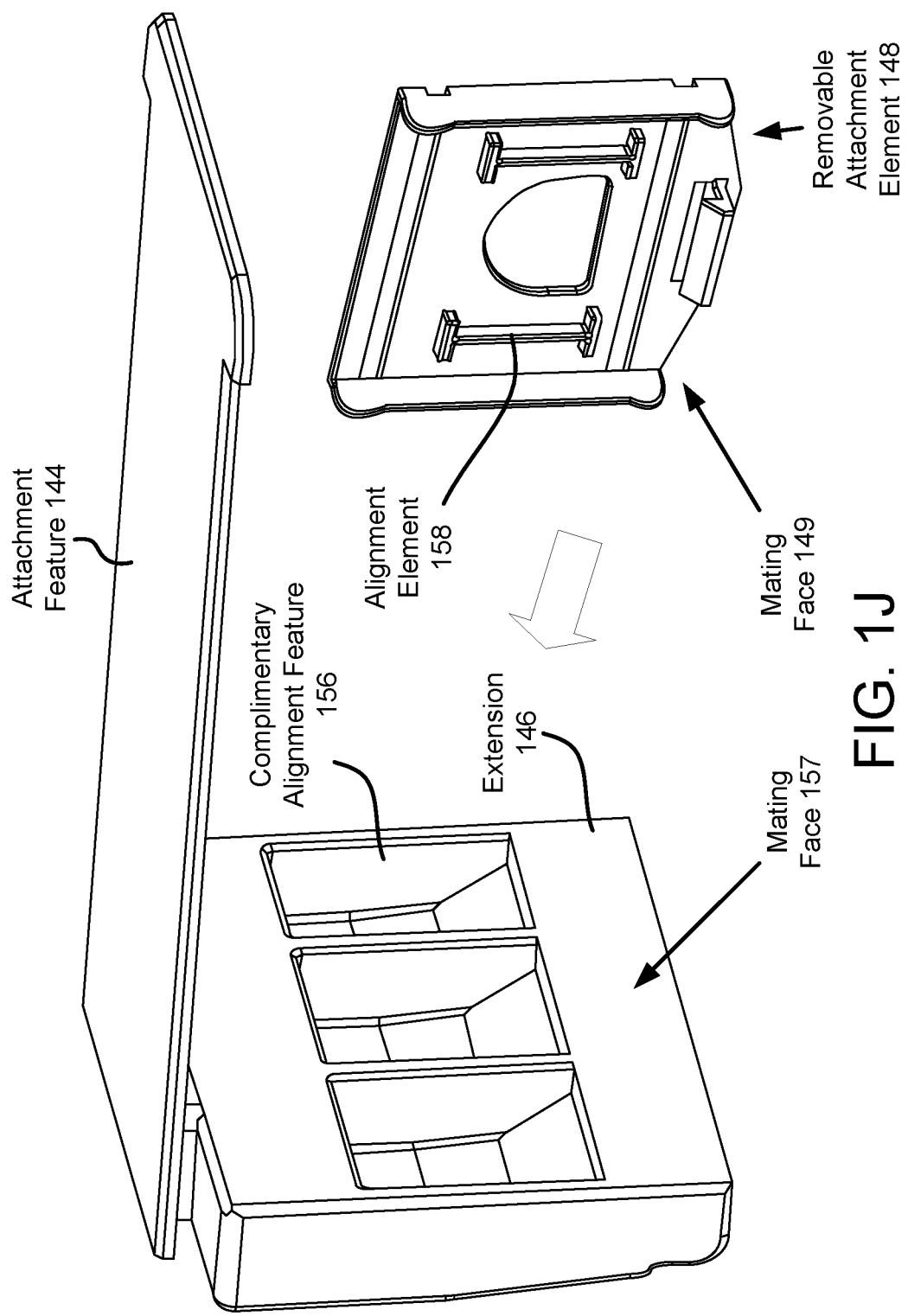
FIG. 1J shows a perspective view diagram illustrating an extension in accordance with an embodiment.

Turning to FIG. 1J, a diagram of a portion of the components of a removable card holder in accordance with an embodiment is shown. Extension 146 may include mating face 157 (e.g., which may be opposite of the complementary electrical contacts, not shown) to which removable attachment element 148 may be aligned and attached. To facilitate alignment and attachment of removable attachment element 148, extension 146 may include one or more of complimentary alignment feature 156.

Complementary alignment feature 156 may facilitate alignment and attachment of removable attachment element 148. For example, complementary alignment feature 156 may be implemented with a recess and/or other structural feature that allows for fixation elements (e.g., 158) of removable attachment element 148 to align removable attachment element 148 with extension 146. To do so, the fixation elements may be inserted into complementary alignment features of extension 146.

Removable attachment element 148 may also include mating face 149 to which it may align and attach to extension 146 (e.g., when mated with mating face 157). To do so, removable attachment element 148 may include one or more fixation elements (e.g., 158). The fixation elements may include raised physical structures and/or other structural features that may slide into or otherwise align with complementary alignment features 156 of extension 146. For example, alignment element 158 may be implemented with raised bars that may fit into complementary alignment feature 156. When so fit, alignment element 158 may provide a mechanical interference that limits movement of removable attachment element 148 with respect to extension 148.

Figure 2:
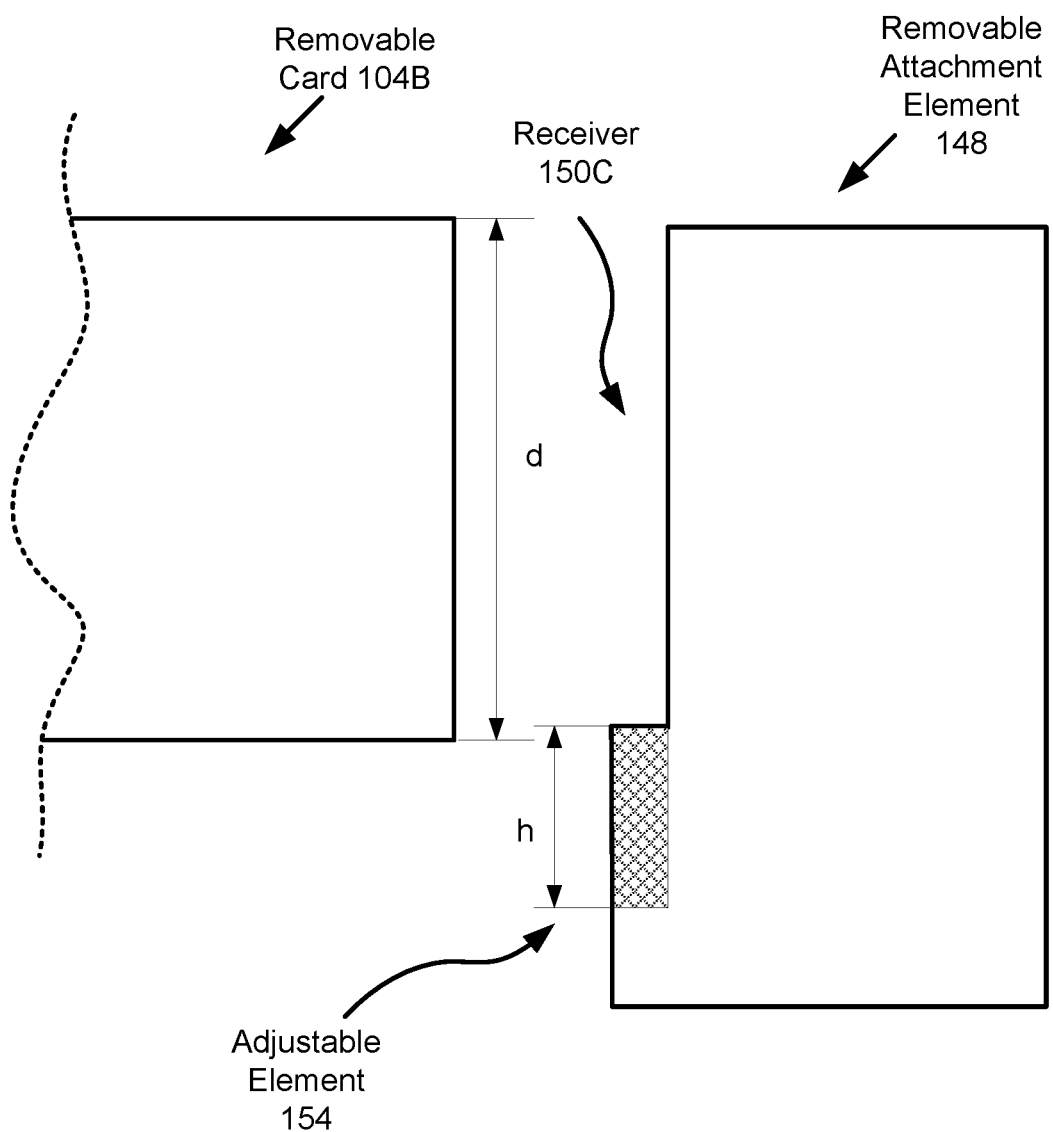
FIG. 2 shows a side view diagram illustrating a removable attachment element in accordance with an embodiment.

As discussed above, embodiments disclosed herein may facilitate securing a broad variety of removable cards having various edge geometries in a removable card holder. Turning to FIG. 2, a diagram of removable attachment element 148 in accordance with an embodiment is shown. To provide for compatibility with removable cards of different thicknesses and/or other geometric features, receiver 150C of removable attachment element 148 may be adjustable to facilitate engagement with removable cards of varying thicknesses. For example, receiver 150C may include adjustable element 154 having a height h that may be adjusted to match dimensions of removable card 104B having a thickness d. Adjustable element 154 may do so by including locking and/or unlocking features (not shown) such as sliders and/or other mechanical interference generating mechanisms that when unlocked allow the height of adjustable element 154 to be adjusted and when locked (e.g., by a person) fix the height at a particular level. By doing so, removable cards having varying thickness d may be positioned in a removable card holder (e.g., 102). By do so, different removable cards having different thicknesses may be secured in a removable card holder thereby improving the likelihood of desirable electrical connections to be formed between the contacts of removable cards and complementary electrical contacts (e.g., 140) of removable card holders.

Figure 3A:
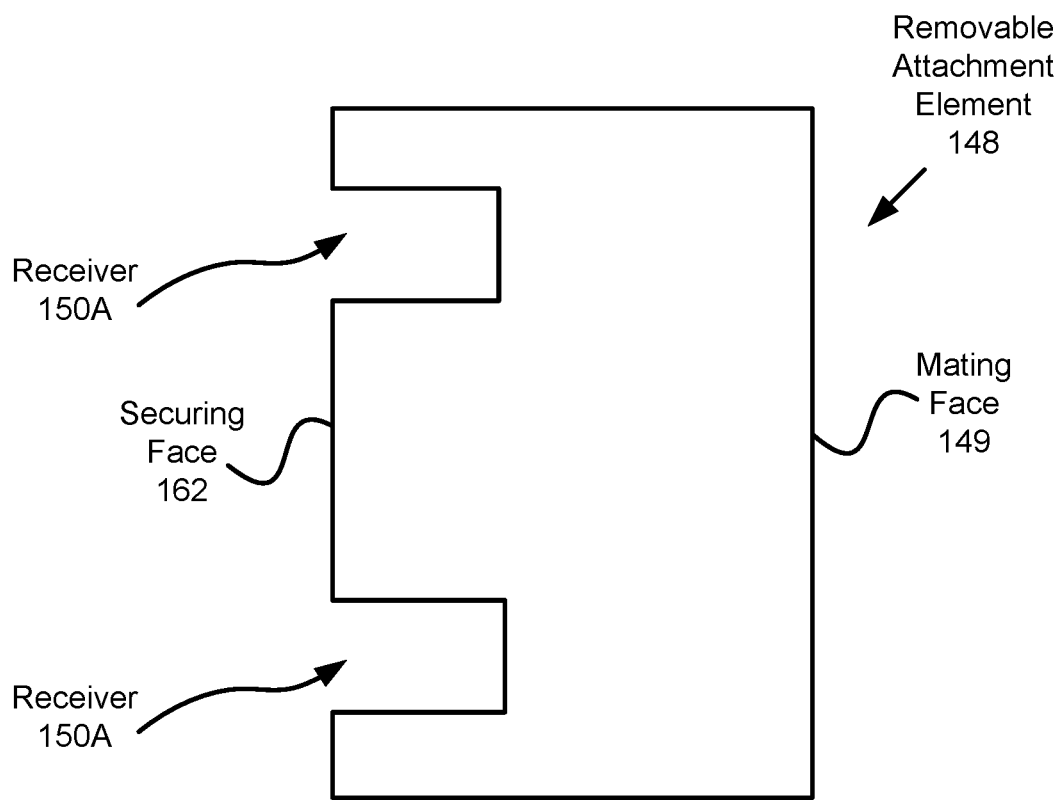
FIG. 3A shows a side view diagram illustrating a removable attachment element in accordance with an embodiment.
Figure 3B:
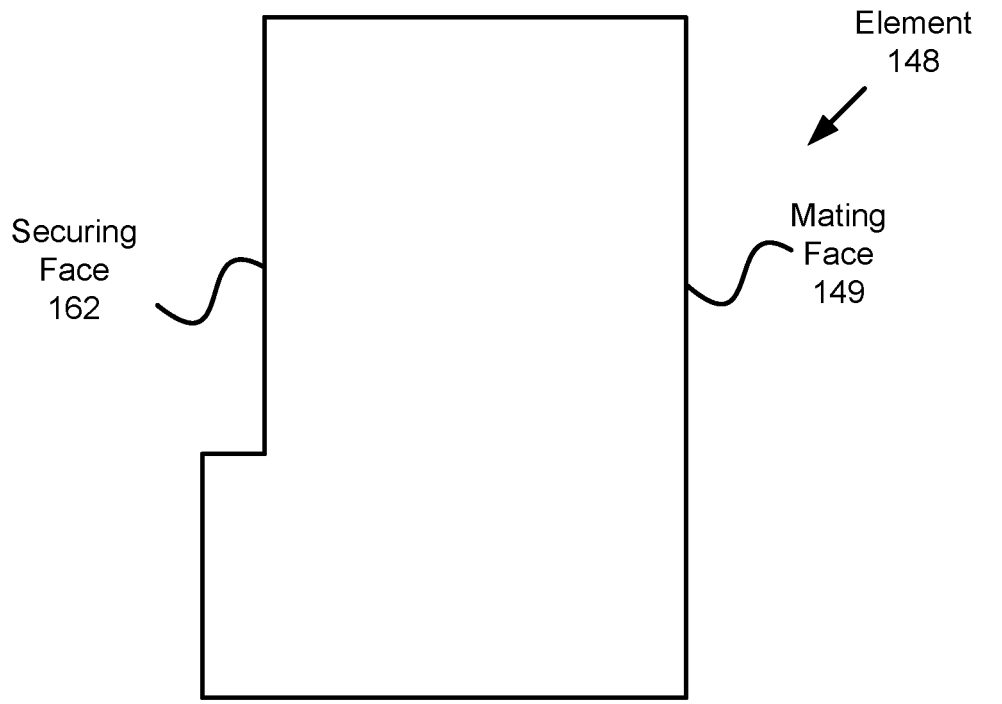
FIG. 3B shows a side view diagram illustrating a removable attachment element in accordance with an embodiment.

To accommodate a broad variety of removable card geometries, a data processing system may be provided with multiple, interchangeable removable attachments elements 148. FIGS. 3A-3B show diagrams of removable attachment elements that may be provided as part of a data processing system.

Turning to FIG. 3A, a diagram of removable attachment element 148 in accordance with an embodiment is shown. As seen in FIG. 3A, removable attachment element 148 may include mating face 149 adapted for the reversible attachment to an extension (e.g., 146), and securing face 162 adapted to secure a removable card (e.g., 104). Mating face 149 and the securing face 162 may be on opposite sides of removable attachment element 148.

Turning to FIG. 3B, a diagram of removable attachment element 148 in accordance with an embodiment is shown. To provide for compatibility with other removable cards, securing second face 162 may include a receiver having a shelf shape adapted to receive an edgeless removable card, as noted above. Thus, by having access to two different removable attachment elements with different geometries as illustrated in FIGS. 3A-3B, a data processing system may secure a broader array of removable cards having different edge geometries.

Figure 3C:
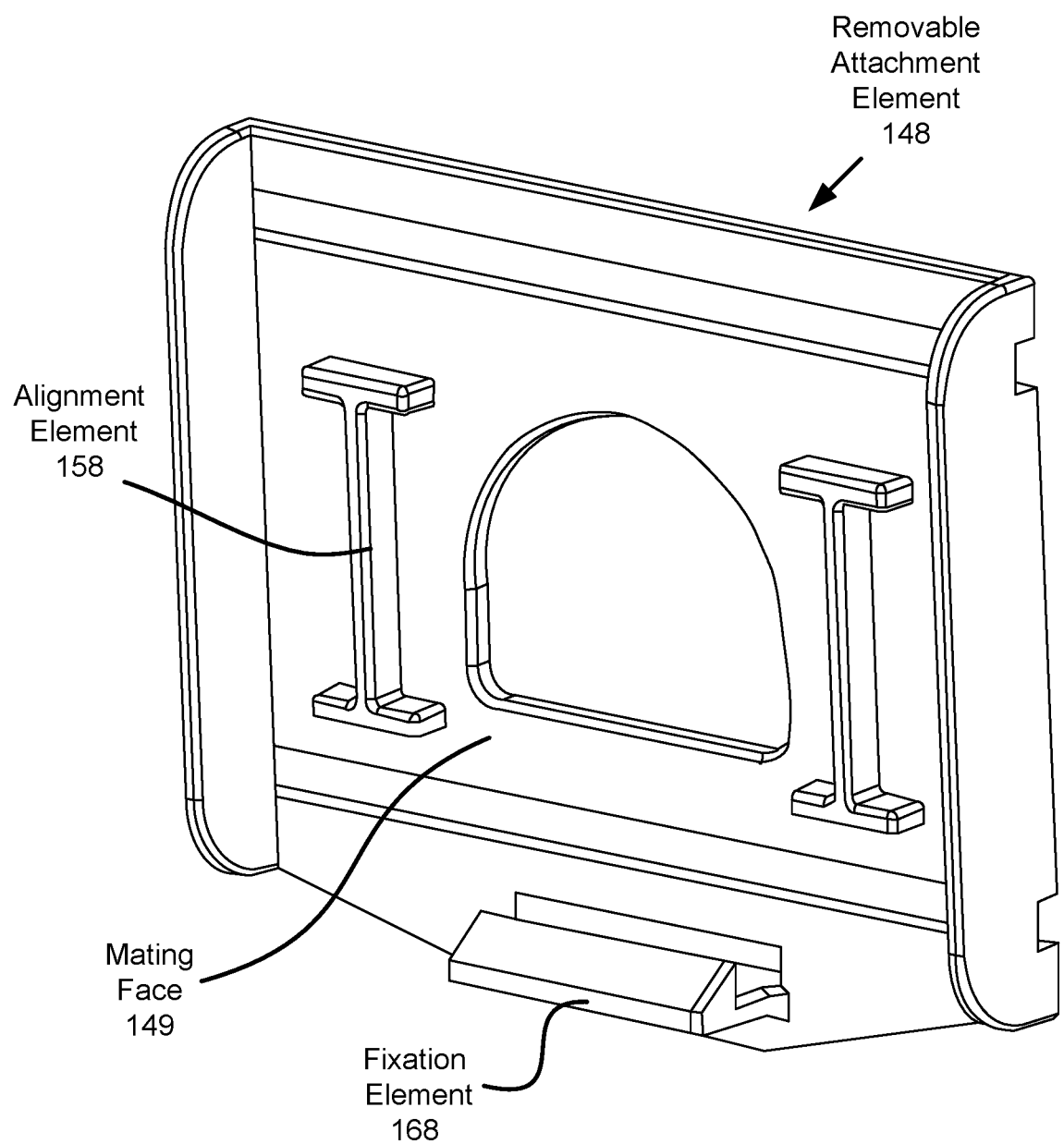
FIG. 3C shows a perspective view schematic diagram illustrating a first face of a removable attachment element in accordance with an embodiment.
Figure 3D:
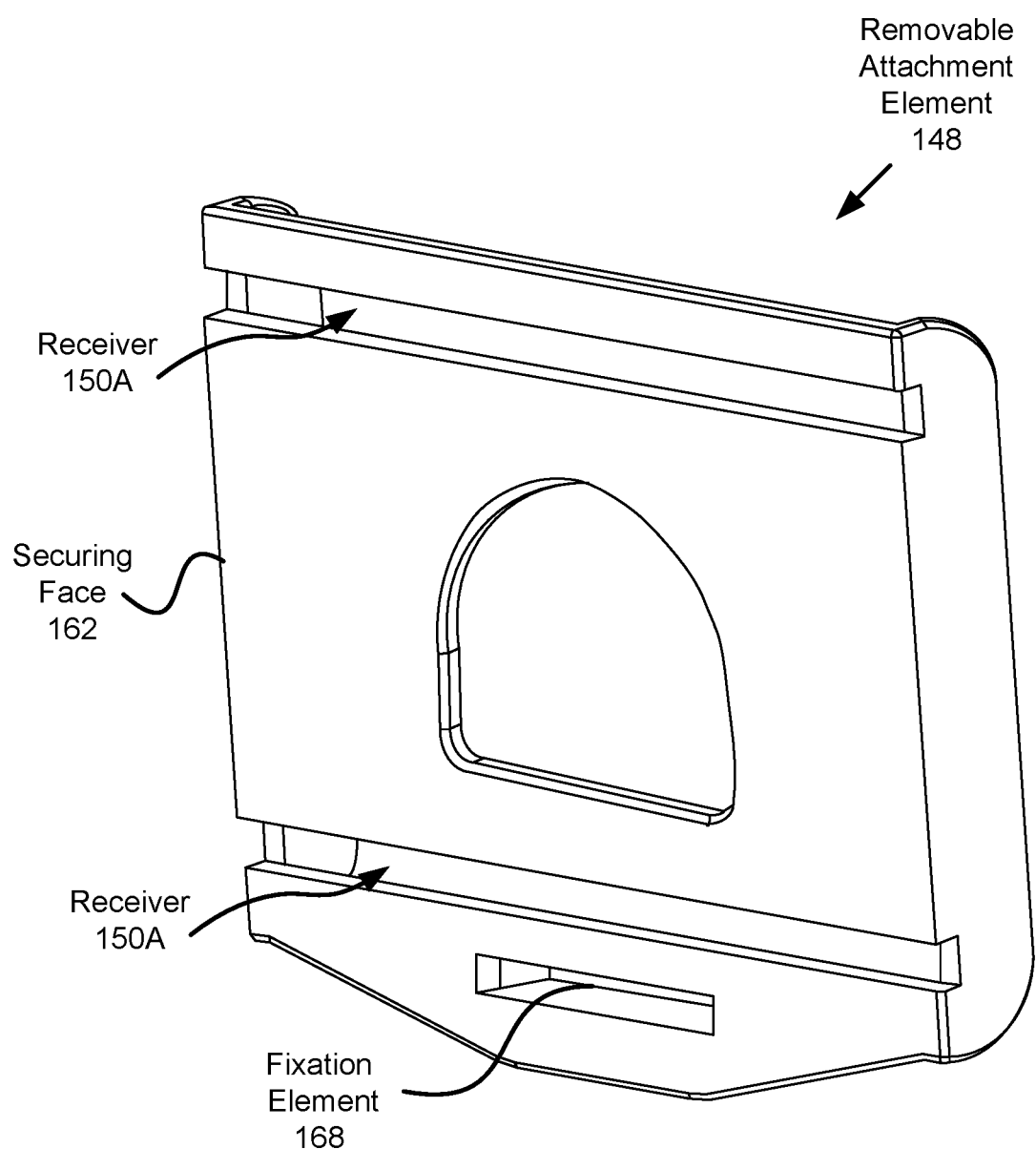
FIG. 3D shows a perspective view schematic diagram illustrating a second face of a removable attachment element in accordance with an embodiment.

To provide for the aforementioned flexibility, a removable attachment element may include various features to facilitate securing of the removable attachment element to a given extension. FIGS. 3C-3D show isometric diagrams of removable attachment element 148 in accordance with an embodiment. In an embodiment, to secure removable attachment element 148 to an extension, mating face 149 may include fixation element 168. Fixation element 168 may be implemented with a clip or other structure that reversibly secures removable attachment element 148 to an extension.

Generally, the clip may deform during attachment of removable attachment element 148 to an extension until removable attachment element 148 is positioned with respect to the extension. Once so positioned, the clip may return to its original shape thereby fixedly securing removable attachment element 148 to the extension. To remove removable attachment element 148, a person may apply pressure to deform fixation element 168 (e.g., downward pressure in the orientation shown in FIG. 3C) thereby releasing removable attachment element 148 from the extension.

Figure 4:
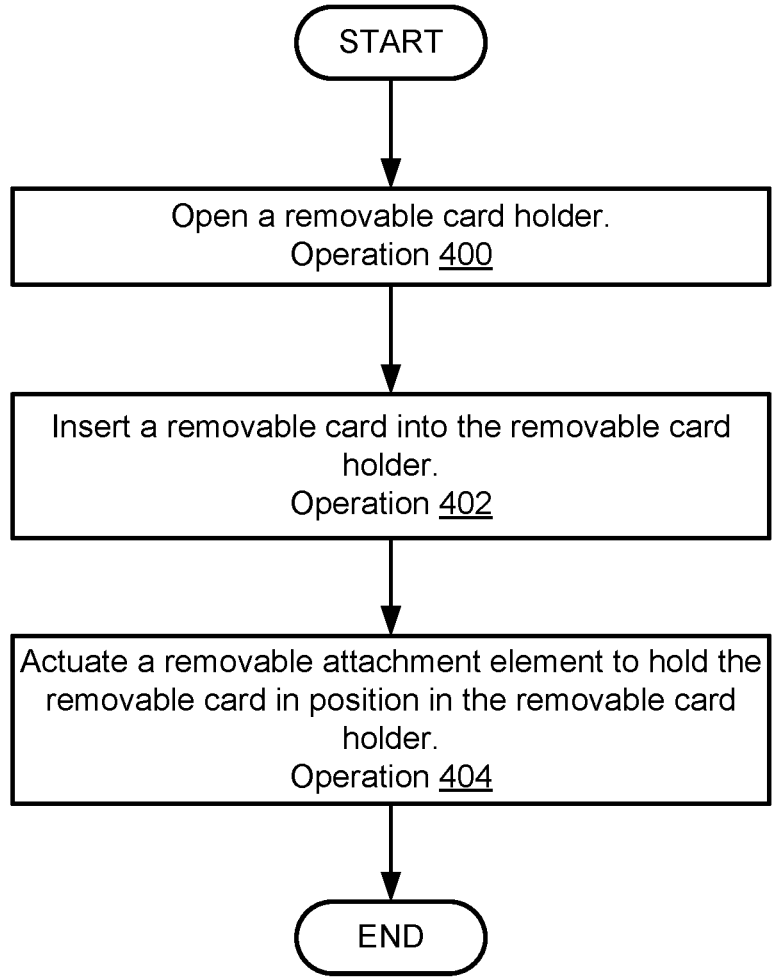
FIG. 4 shows a flow diagram illustrating a method of securing a removable card in a removable card holder in accordance with an embodiment.

As discussed above, embodiments disclosed herein may facilitate securing of removable cards in removable card holders. Turning to FIG. 4, a flow diagram illustrating a method of securing a removable card in a removable card holder in accordance with an embodiment is shown. While the operations are illustrated in FIG. 4 as being performed in a particular order, the operations may be performed in other orders, may be omitted, may be repeated, and/or may be performed in a parallel or partially overlapping in time manner without departing from embodiments disclosed herein.

At operation 400, a removable card holder is opened. The removable card holder may be opened by moving an extension away from complementary electrical contacts. The extension may be moved, for example, by application of force to the extension, by unlocking of locking mechanisms, and/or by performing other actions.

At operation 402, a removable card is inserted into the removable card holder. The removable card may be inserted into the removable card holder through a gap or other mechanical feature created by opening the removable card holder. As part of insertion, electrical contacts of the removable card may be operably connected to complementary electrical contacts of the removable card holder.

As part of the insertion a removable attachment element that will secure the removable card may be changed out or modified so that the geometry of the removable attachment element complements the removable card. For example, if the removable card does not include a protruding edge, then a removable attachment element having a shelf shape may be attached to a corresponding portion of an extension of the removable card holder. Likewise, if a removable attachment element includes adjustable features (e.g., like an adjustable height shelf shape), these adjustable features may also be modified to ensure compatibility between the removable attachment element and the removable card.

At operation 404, a removable attachment element is actuated to hold the removable card in the removable card holder. The removable attachment element may be actuated by (i) closing the removable card holder and/or (ii) manual actuation by user intervention of the removable attachment element.

The method may end following operation 404.

Using the method discussed in FIG. 4, embodiments disclosed herein may provide a data processing system that is compatible with a broader range of removable cards. Consequently, the data processing system may be able to take on a broader array of types of computing resources provided by various removable cards.

Figure 5:
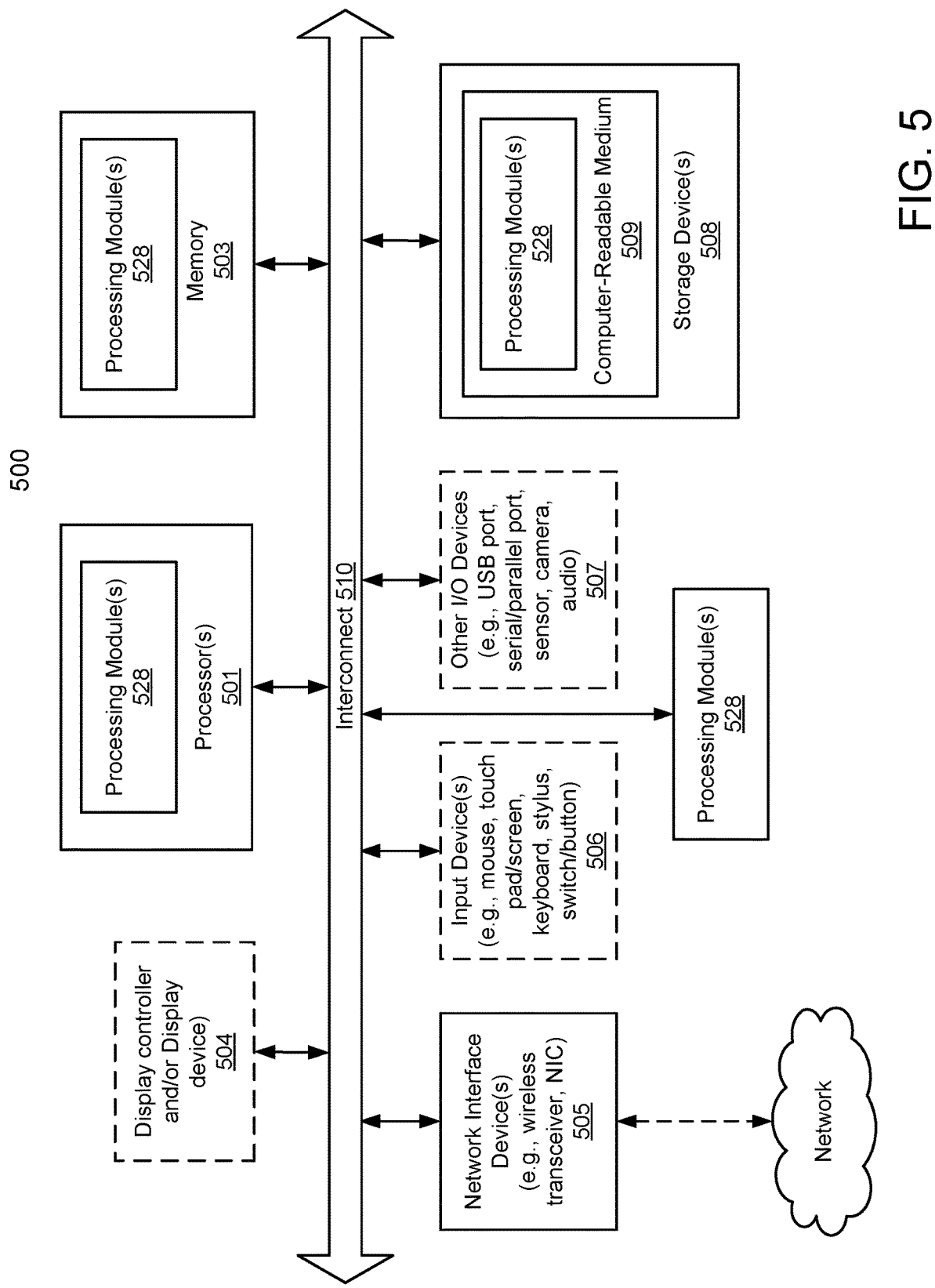
FIG. 5 shows a block diagram illustrating a computing device in accordance with an embodiment.

As discussed above, various components may be implemented with computing devices. For example, any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of the data processing systems or computing devices described above, and may perform any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis (e.g., 110) of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A data processing system, comprising:
   a processor; and
   a removable card holder comprising:
   complementary electrical contacts operably connected to the processor, the complementary electrical contacts being adapted to contact electrical contacts of a removable card while the removable card is positioned in the removable card holder to form an operable connection between the processor and the removable card;

an extension adapted to:
   translate between two positions, in a first position of the two positions the extension is a first distance away from the complementary electrical contacts and in a second position of the two positions the extension is a second distance away from the complementary electrical contacts; and
a removable attachment element adapted to:
   reversibly attach to the extension, and
   while attached to the extension and the extension is in the first position and the removable card is positioned in the removable card holder, maintain alignment of the removable card between the complementary electrical contacts and the extension.

2. The data processing system of claim 1, wherein the removable attachment element comprises a receiver having a complementary shape to an edge of the removable card, the complementary shape being sized to allow the edge of the removable card to be partially positioned inside an interior region of the receiver.

3. The data processing system of claim 2, wherein the removable attachment element comprises:
a first face adapted for the reversible attachment to the extension; and
a second face adapted to receive the removable card,
wherein the first face and the second face are on opposite sides of the removable attachment element.

4. The data processing system of claim 3, wherein the first face comprises:
an alignment element for insertion into a complementary alignment feature of the extension, the alignment element being adapted to, while inserted in the complementary alignment feature, position a fixation element of the removable attachment element with respect to a complementary fixation element of the extension,
wherein the fixation element fixedly secures the removable attachment element to the extension, and fixedly securing the removable attachment element to the extension comprises a temporary deformation of the fixation element as the fixation element moves toward the complementary fixation element.

5. The data processing system of claim 1, wherein the removable attachment element comprises a first receiver to receive the removable card and a second receiver to receive a second removable card.

6. The data processing system of claim 1, wherein the removable attachment element comprises a receiver having a shelf shape adapted to receive an edgeless removable card, the shelf shape preventing:
first movement of the removable card away from the complementary contacts.

7. The data processing system of claim 6, wherein the shelf shape further enables second movement of the removable card in a first rotation about the complementary contacts and third movement of the removable card in a second rotation about the complementary contacts, the second movement and the third movement being in opposite directions.

8. The data processing system of claim 1, wherein the removable attachment element comprises a receiver having a shelf shape adapted to receive an edgeless removable card and the shelf shape is adjustable to facilitate engagement with edgeless removable cards of varying thicknesses.

9. The data processing system of claim 1, wherein the removable card holder comprises an enclosure and an attachment feature through which the extension is attached to a device cage.

10. The data processing system of claim 9, wherein the attachment feature is adapted to allow the extension to translate with respect to the complementary electrical contacts.

11. A removable card holder comprising:
complementary electrical contacts operably connected to a processor of a data processing system, the complementary electrical contacts being adapted to contact electrical contacts of a removable card while the removable card is positioned in the removable card holder to form an operable connection between the processor and the removable card;
an extension adapted to:
   translate between two positions, in a first position of the two positions the extension is a first distance away from the complementary electrical contacts and in a second position of the two positions the extension is a second distance away from the complementary electrical contacts; and
a removable attachment element adapted to:
   reversibly attach to the extension, and
   while attached to the extension and the extension is in the first position and the removable card is positioned in the removable card holder, maintain alignment of the removable card between the complementary electrical contacts and the extension.

12. The removable card holder of claim 11, wherein the removable attachment element comprises a receiver having a complementary shape to an edge of the removable card, the complementary shape being sized to allow the edge of the removable card to be partially positioned inside an interior region of the receiver.

13. The removable card holder of claim 12, wherein the removable attachment element comprises:
a first face adapted for the reversible attachment to the extension; and
a second face adapted to receive the removable card,
wherein the first face and the second face are on opposite sides of the removable attachment element.

14. The removable card holder of claim 13, wherein the first face comprises:
an alignment element for insertion into a complementary alignment feature of the extension, the alignment element being adapted to, while inserted in the complementary alignment feature, position a fixation element of the removable attachment element with respect to a complementary fixation element of the extension,
wherein the fixation element fixedly secures the removable attachment element to the extension, and fixedly securing the removable attachment element to the extension comprises a temporary deformation of the fixation element as the fixation element moves toward the complementary fixation element.

15. The removable card holder of claim 12, wherein the removable attachment element comprises a second receiver to receive a second removable card.

16. The removable card holder of claim 11, wherein the removable attachment element comprises a receiver having a shelf shape adapted to receive an edgeless removable card, the shelf shape preventing:
first movement of the removable card away from the complementary contacts; and second movement of the removable card in a first rotation about the complementary contacts.

17. The removable card holder of claim 16, wherein the shelf shape enables third movement of the removable card in a second rotation about the complementary contacts, the second movement and the third movement being in opposite directions.

18. The removable card holder of claim 16, wherein the shelf shape is adjustable to facilitate engagement with removable cards of varying thicknesses.

19. The data processing system of claim 5, wherein the first receiver receives the removable card within an interior region of the first receiver and a second receiver receives the second removable card in an interior region of the second receiver.

20. The data processing system of claim 1, wherein a face of the extension that receives the removable card through the removable attachment element faces a face of the removable card holder that comprises the complementary electrical contacts.

* * * * *